United States Patent [19]
Jurisch

[11] 3,983,071

[45] Sept. 28, 1976

[54] PROCESS OF PREPARING SAND CORES BY USING OXAZOLINE CONDENSATES

[75] Inventor: Louis A. Jurisch, Marengo, Ill.

[73] Assignee: IMC Chemical Group, Inc., Terre Haute, Ind.

[22] Filed: Jan. 2, 1975

[21] Appl. No.: 537,869

Related U.S. Application Data

[62] Division of Ser. No. 378,366, July 11, 1973, Pat. No. 3,919,135.

[52] U.S. Cl................................ 260/42; 106/38.2; 106/38.22; 106/38.7; 260/37 R; 260/39 SB; 260/67.5; 260/73 L

[51] Int. Cl.²..................... C08F 4/28; C08F 26/02

[58] Field of Search............... 106/38.2, 38.22, 38.7; 260/67.5, 73 R, 73 L, 39 SB, 42, DIG. 40, 37 R

[56] References Cited

UNITED STATES PATENTS

| | | | |
|---|---|---|---|
| 3,248,397 | 4/1966 | Purcell | 260/33.6 UA X |
| 3,367,895 | 2/1966 | Clark | 260/67.5 X |
| 3,654,201 | 4/1972 | Mansour et al. | 260/23 ST |
| 3,725,350 | 4/1973 | Hunsucker | 260/67.5 |

*Primary Examiner*—Lucille M. Phynes
*Attorney, Agent, or Firm*—Robert H. Dewey; Howard E. Post

[57] ABSTRACT

An improved process for the preparation of sand cores for foundry use in metal casting by mixing sand with a binder, and packing into a mold to harden. The improvement in the process resides in using as the binder an oxazoline or condensation product thereof.

14 Claims, No Drawings

PROCESS OF PREPARING SAND CORES BY USING OXAZOLINE CONDENSATES

This is a division of copending application Ser. No. 378,366, filed 7/11/73, now U.S. Pat. No. 3,919,135 granted Nov. 11, 1975.

BACKGROUND OF THE INVENTION

This invention relates to a process for the preparation of sand cores for metal castings in the foundry industry.

In a particular aspect this invention relates to a 100% solids, essentially non-polluting binder for the sand.

In foundry practice, metal casting is conventionally carried out by mixing an aggregate, e.g. sand, with a foundry sand binder capable of hardening the aggregate, tamping it into a mold to form a sand core and letting it stand for a period of time to allow the binder to set up whereby the sand core becomes self-supporting, and then removing the mold. The molten metal is subsequently poured into the sand core and when cool, the sand core is broken away. The resulting casting is then finished by grinding away the imperfections.

Many materials have been used as the binder in preparing such cores. Some binders are of a class of no-bake, or cold setting resins, i.e. designed to be cured without the application of heat, while others are of a class suitable for "hot box" application. Hot box means foundry operations wherein the resin binders are cured by the application of heat. Alkyd resins have been widely used as the binder. These resins are too viscous to be used alone however. It has therefore been necessary to dilute them with a solvent so that they can be adequately mixed with the sand. The sand core must then be baked to set the alkyd and volatilize the solvent.

This process for preparing the sand core is in widespread use but it presents several problems of considerable magnitude. Chief of these is the danger of fire from the solvent. Although the core is sometimes baked before the molten metal is poured into it, there is frequently considerable residual solvent, especially where large castings are being made. Consequently flash fires are common in foundries.

Another common problem is air pollution in the foundry atmosphere due to the emission of noxious fumes from decomposition of the binder resulting from the heat of the molten metal. Large quantities of irritating white smoke are common in foundries during the pouring step. Although exhaust fans and ventilation are provided, the workers closest to the operation are exposed and furthermore the air outside the foundry is polluted by the exhaust.

J. J. Engel et al. discussed other problems and disclosed a solution thereto in U.S. Pat. No. 3,255,500, which is incorporated herein by reference thereto. Engel et al. disclosed a binder composition consisting of drying oils containing ethylenic unsaturation such as the hydrocarbon polymers and copolymers prepared from butadiene, styrene, cyclopentadiene and the like, but preferably the alkyd resins having a hydroxyl value of at least 25. The drying oil is used in combination with isocyanates and solvents preferably with a catalyst.

SUMMARY OF THE INVENTION

It is an object of this invention to provide a solvent-free, no-bake binder composition for preparation of sand cores.

It is another object of this invention to provide a binder composition having minimal air pollution potential.

It is yet another object of this invention to provide a binder composition which does not cause or contribute to a fire hazard.

Other objects will be apparent to those skilled in the art from the disclosure herein.

It is the discovery of this invention that the binder for the preparation of sand cores can be provided by a member selected from the class of mono-, bis- or tris-oxazolines, or mixtures thereof. Many of these oxazolines are useful as is but when X in formula I below is $H_2$, then the oxazoline can be modified when desired — and when R in formula I is saturated they are so modified — by condensing the oxazoline with an ethylenically unsaturated monomer having a terminal

group and further condensing the compound thereby obtained with formaldehyde to introduce additional $=CH_2$ groups. After mixing the oxazoline with the aggregate, a polyisocyanate can be mixed therewith, if desired, but not necessarily, as is known in the art.

DETAILED DISCUSSION

The oxazoline compounds useful in the practice of this invention correspond to formula I

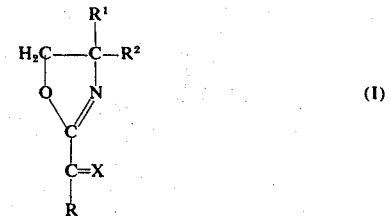

where $R^1$ and $R^2$ can be methyl, ethyl, hydroxymethyl, or acyloxymethyl corresponding to the formula

and can be the same or different; R can be hydrogen or an alkyl or alkenyl group of from 1 to about 18 carbon atoms, and X can be $=CH_2$ or $H_2$; or the binder can be supplied by compounds corresponding to formula (II)

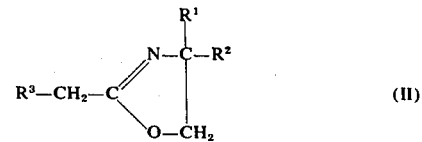

where $R_3$ can be the group

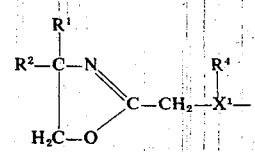

where $X^1$ is any divalent or trivalent saturated or unsaturated aliphatic hydrocarbon group including straight chain or branched chain, of from 0 to 32 carbon atoms. When $X^1$ is divalent, $R^4$ is hydrogen and when $X^1$ is trivalent, $R^4$ is the group

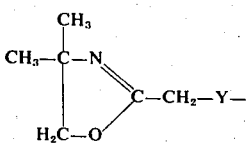

wherein Y is a saturated or unsaturated hydrocarbon radical of 16 carbon atoms.

Some of these compounds are commercially available or they can be prepared by reacting an alkanolamine corresponding to the formula

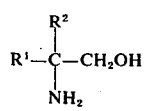

with a monocarboxylic acid corresponding to the formula $RCH_2COOH$ by known methods, e.g. by the method of Purcell, U.S. Pat. No. 3,336,145, which is incorporated herein by reference thereto or with a dicarboxylic acid of from 4 to about 36 carbon atoms or with a tri-carboxylic acid of up to about 54 carbon atoms, respectively, by the method of A. W. Campbell, et al., U.S. Pat. No. 3,419,520, which is incorporated herein by reference thereto. The bis-oxazolines and trisoxazolines thereby obtained correspond to the formula

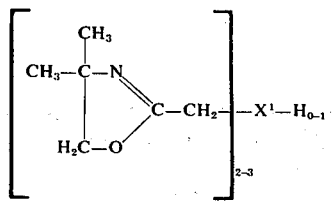

The monocarboxylic acids suitable for forming the monooxazoline compounds of formula I include saturated and unsaturated fatty acids from 2 to 22 carbon atoms, including mixtures thereof. Such acids are well-known in the art and include, but are not limited to; acetic, propionic, decanoic, lauric, linoleic, linolenic, oleic, stearic, behenic, etc. They are commercially available and the usual commercial grades, including the crude materials, are suitable for preparing the oxazoline compounds.

The dicarboxylic acids suitable for preparing the bisoxazolines of formula II include, but are not limited to, acids of from 4 to 10 carbon atoms, viz., succinic, glutaric, adipic, sorbic, pimelic, suberic, azelaic, and sebacic and mixtures thereof. Also the dimer of $C_{18}$ unsaturated fatty acids is a suitable and preferred dicarboxylic acid. Dimerized acids and oxazolines made therefrom are known to those skilled in the art. They are described in, for example, U.S. Pat. No. 3,661,861 issued to J. H. Hunsucker which is incorporated herein by reference thereto and in Technical Bulletin No. 438C, published by Emery Industries, Inc., Cincinnati, Ohio.

The tricarboxylic acids suitable for preparing the tris-oxazoline compounds include, but are not limited to, the trimer of $C_{18}$ unsaturated fatty acids. This trimerized acid and oxazolines made therefrom are known to those skilled in the art. They are described in U.S. Pat. No. 3,661,861 and in the aforementioned Technical Bulletin No. 438C.

In the embodiment of the invention represented by the compounds of formula I, the compounds where X is $=CH_2$ and R is an unsaturated group can be employed as the binder without modifiers and without catalysts. Of these compounds, the preferred ones are those where $R^1$ and $R^2$ are the acyloxymethyl groups represented by the formula

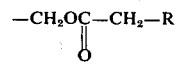

were a rapid set time of the sand core is desired, metal driers up to 10% by weight can be incorporated. Suitable driers and combinations thereof are those known in the art, including but not limited to peroxides and/or compounds of cobalt, e.g. cobalt naphthenate, lead, e.g. lead octoate, tin, e.g. stannous octoate, potassium chromate and zinc. Zinc driers are preferred and a combination of zinc drier and a peroxide is particularly preferred. Suitable peroxides are well known in the art. Typical peroxides include, but are not limited to ditert.-butyl peroxide, hydrogen peroxide, methyl ethyl ketone peroxide, benzoyl peroxides, cumeme hydroperoxide, and tert.-butyl perbenzoate. When used, either alone or in combination with the metal driers, the peroxides are generally employed at a concentration of about 0.5 to about 5% based on the weight of the resin.

The compounds of formula I wherein X is $H_2$ can be modified, and preferably are so modified, by reacting, e.g. copolymerizing, them with a dissimilar ethylenic unsaturated monomer having a terminal $CH_2 = C<$ group in amounts necessary to give the desired modification.

A particularly preferred class of ethylenic unsaturated monomers are those having one ethylenic unsaturation such as the olefins, e.g. ethylene, propylene, isobutylene; acrylyl and alkacrylyl compounds, e.g. acrylic haloacrylic, and methacrylic acids, esters, nitriles, and amides — for example, acrylonitrile, methyl methacrylate, ethyl methacrylate, butyl methacrylate, octyl methacrylate, cyclohexyl methacrylate, methoxymethyl methacrylate, n-butoxyethyl methacrylate, n-butoxyethoxyethyl methacrylate, aminoalkyl methacrylates such as beta-diethylaminoethyl methacrylate, chloroethyl methacrylate, methacrylic acid, ethyl acrylate, and alphachloroacrylic acid; N-vinyl imides, e.g. N-vinyl-phthalimide and N-vinyl succinimide, N-vinyllactams, e.g. N-vinylcaprolactam and N-vinylbutyrolactam, vinyl aryls, e.g. styrene, methyl styrene and vinylnaphthalene, and other vinyl derivatives such as methyl vinyl ketone, vinylpyridine, vinyl isobutyl ether, and vinyl ethyl ether. The resulting compounds are then condensed with formaldehyde amounts and dehydrated to yield vinylated derivatives.

The modified oxazolines are readily prepared by condensing with the ethylenically unsaturated monomer, e.g. styrene, vinyl toluene or acrylic ester in a weight ratio of about 1 to about 50% at a temperature of about 300°–400°F preferably in the presence of a chain transfer agent and a peroxide catalyst. The reaction mixture is allowed to cool slightly, then formaldehyde — about 3–10% by weight of unsaturated monomer — is introduced slowly. Preferably an alkaline catalyst, e.g. lithium hydroxide, and a polymerization inhibitor, e.g. t-butyl catechol, are added in suitable amounts. Heating of the reaction mixture is then maintained at about 375° to about 400°F until water and alkanol (if any) have been separated by distillation. Preferably the formaldehyde is added as a solution in an alcohol, e.g. a lower alkanol of 1 to 4 carbon atoms, which are commercially available. It can, however, also be supplied as paraformaldehyde or as the 37 or 44% commercial-grade aqueous solution. Gaseous formaldehyde from a formaldehyde generator is also suitable for use. Water of reaction, and any water or alkanol introduced with the formaldehyde, is removed by distillation. The residue is useful as is without further refinement.

The preparation of a particularly preferred binder is described in Example 1.

R. F. Purcell in U.S. Pat. No. 3,248,397 disclosed a process for bodying oxazolines corresponding to formula I where X is $=CH_2$, by reacting the oxazoline with a member of the foregoing class of unsaturated compounds. It might therefore be supposed that the compounds thereby obtained would be useful in the practice of this invention. It has been found however that they are much too viscous to be used without a solvent. The use of a solvent would however defeat one of the objects of the invention, which is to provide a solvent-free, substantially 100% non-volatile binder.

The oxazoline binders and modifications thereof of the present invention have praticular utility in the preparation of binders for sand cores used for casting in foundries and for hot box applications. The binder is blended with the aggregate, e.g. sand, in an amount sufficient to provide about 0.5–5.0% or more, usually about 0.5–1.5% of the binder based on the weight of the sand. When preferred, up to 10% of metal driers, preferably 3–7% can be blended with the binder before mixing with the aggregate. The treated sand is then placed in a mold to harden. If a rapid hardening time is required, the wet sand can be thoroughly mixed with an amount of polyisocyanate sufficient to provide about 20% based on the weight of the binder.

In another embodiment of the present invention, the binder can be modified by incorporating therein about 10% of a low-molecular weight hydrocarbon resin, or if a monooxazoline, additionally about 10% of a polyoxazoline corresponding to formula II can be added. It has been discovered that by varying the polyoxazoline content, the time required for the sand to harden can be varied.

When especially rapid set time is needed with the oxazoline binders and condensates thereof, the selected binder is blended with the aggregate and then up to 20% or more of a di- or polyisocyanate is mixed therewith, as is known in the art.

Polyisocyanates suitable for the practice of this invention include but are not limited to polymethylene polyphenylisocyanate. Other suitable isocyanates are known in the art, e.g. the aliphatic polyisocyanates such as hexamethylene diisocyanate; alicyclic polyisocyanates such as 4,4'-dicyclohexylmethane diisocyanate; and aromatic polyisocyanates such as 1,4- and 2,6-toluene diisocyanate; diphenyl methyl diisocyanate and the dimethyl derivative thereof. Further examples of suitable polyisocyanates are 1,5-naphthalene diisocyanate; triphenyl methane triisocyanate; xylylene diisocyanate and the methyl derivative; polymethylene polyphenyl isocyanate; chlorophenylene-2,4-diisocyanate, and the like.

The binder of the present invention provides numerous advantages in the preparation of sand cores for foundry casting. The advantages include the following points:

1. It is a 100% solids system (though liquid) so there are no delays for solvent evaporation.
2. Because it is solvent-free, it does not create or aggravate a danger of fire in the foundry.
3. There is no contribution to atmospheric pollution from the foundry stacks, nor any contribution to pollution of the workroom atmosphere.
4. The binder composition has low viscosity at ambient temperatures and wets the sand excellently. As a result it is easily mixed with the sand.
5. By varying the amount of polyoxazoline, the hardening time of the sand core can be easily controlled.

The invention will be better understood with reference to the following examples. It is understood, however that these examples are intended for illustration only and it is not intended that the invention be limited thereby.

EXAMPLE 1

A preferred oxazoline binder as prepared by mixing 250 lb. tall oil fatty acids containing less than 4% rosin and having an equivalent weight of 284 (0.88 equivalents), 16 lb of propionic acid (0.216 equivalents) 43 lb of tris(hydroxymethyl)aminomethane (0.355 moles or 1.065 equivalents). The mixture was heated with stirring to 460°F in a reaction vessel equipped with a distillation column and a take-off head. During the heating step, the water of reaction was removed by distillation. The reaction was monitored by occasionally determining, by known methods, the acid value. When it was below 5, the mixture was allowed to cool to 300°F and there was then added over a period of 90 min. a mixture consisting of 75 lb styrene, 2.5 lb ditert.-butyl peroxide catalyst, and 1.2 lb of n-dodecylmercaptan chain transfer agent.

The resulting mixture was heated to 400°F for 90 min. thereby condensing the styrene and the oxazoline. It was allowed to cool to 375°F and there was then gradually added below the liquid level a mixture consisting of 0.06 lb of lithium hydroxide (LiOH.H$_2$O), and 20 lb. of formaldehyde as a 40% by wt. solution in butanol. About 2 hours was required for the addition. During this step, butanol and water were removed by distillation. When all the butanol and water had been removed, the product was cooled and filtered, yield: 402 lb. It had a viscosity of V-Z; color < 12; and acid value < 1; the density was 8.1 ± 0.1 lb/gal. The product was tested for volatility at 100°C. It was completely non-volatile, i.e. 100% solids.

The product obtained above was used as a binder to prepare a sand core for foundry use. An amount of the resin sufficient to provide 1% by weight based on the weight of the sand was mixed thoroughly with sufficient diethylenetriamine (later found to be unnecessary) to provide 1% by weight of the resin and with metallic drier to provide 7% by weight of the resin. The drier used was a mixture of 4% of a 24% Pb salt (lead octoate) and 3% of a 6% cobalt salt (cobalt naphthenate), both of which are conventional in the art.

The foregoing resin-amine-drier mixture was then thoroughly mixed with the predetermined weight of the casting sand and then the wet sand was thoroughly mixed with a quantity of polymethylene polyphenylisocyanate, sufficient to provide 20% based on the weight of the resin. The sand was packed into a mold and in 80 minutes it had hardened sufficiently that the mold could be stripped from the sand. By comparison, when the sand core was prepared with a conventional alkyd resin binder used in the art, the stripping time was about 15 minutes. Despite the longer hardening time, the product was deemed useful.

EXAMPLE 2

The experiment of Example 1 was repeated in all essential details except that in preparing the binder composition for the sand core, there was additionally added to the resin-drier-amine mixture 10% of low molecular wt. styrene-butadiene rubber (Ricon 150 made by the Richardson Co.) based on the weight of the resin. Ricon 150 is a high iodine number hydrocarbon resin of low molecular weight.

The sand core so prepared was hard enough after 75 minutes that the mold could be stripped from the sand. The binder composition was deemed useful.

EXAMPLE 3

The experiment of Example 2 was repeated in all essential details except that in preparing the binder composition for the sand core, there was additionally added to the resin-drier-amine-Ricon 150 mixture, 10% of a polyoxazoline, based on the weight of the resin, prepared from 1 mole of trimerized linseed fatty acid, known in the art, and 3 moles of 2-amino-2-methyl-1-propanol.

The sand core so prepared was hard enough after 45 minutes that the mold could be stripped from the sand. The binder composition was deemed useful.

EXAMPLE 4

The experiment of Example 1 was repeated in all essential details except that 10,717 lb. of tall oil fatty acids, 805 lb. of propionic acid, 2121 lb of tris(hydroxymethyl)aminomethane and 5 lb. of tridecyl phosphite were used. After the acid value was below about 5, a mixture of styrene 3780 lb., ditert.-butyl peroxide 126 lb., and n-dodecylmercaptan 1.2 lb. was gradually added over a period of 90 minutes. The reaction mixture was heated to 400°F for 30 minutes and was then cooled to 375°F. A mixture of 3.5 lb. of lithium hydroxide, 2520 lb. of butyl Formcel (40% HCHO) and 3.5 lb. of t-butyl catechol were added. The solvent and water of reaction were stripped and 3.5 lb. of tert.-butyl catechol were added. The mixture was then cooled and filtered. The product was clear, had a viscosity of Y + one-half and a color of 10. The non-volatile content was 100%.

EXAMPLE 5

A portion, 3.5 lb. of the resin prepared in Example 4 was mixed with 7% of metallic drier (4% of lead salts and 3% of cobalt salts) and was mulled with sand for 2½ minutes. There was added 0.7 lb. of polymethylene polyphenylisocyanate (PAPI made by The Upjohn Co., Kalamazoo, Mich.) and mulled an additional 2 minutes. The temperature of the sand at the start was 62°F and the finish, 78°F.

Several molds were filled with the coated sand, were allowed to set for 1¾ to 2 hours, then dumped. Set time was satisfactory. No crumbling or weak points were observed. The cores were allowed to set for 24 hours. The Campbell hardness was 45–50 compared with 35 for cores prepared with the previously-used alkyd resin binder.

Molten iron at 2600°–2800°F was poured into the molds. There was less smoke emitted than when the sand core was prepared with an alkyd resin binder, and no obnoxious fumes were emitted during pouring. By comparison, the alkyd resin binder emitted irritating fumes. Also, no flashing of fire occurred. After 20 minutes, the mold was broken away and the castings were deemed to be of high quality. The sand in contact with the metal was clean and none adhered to the metal. Only minimal grinding was necessary to finish the casting.

EXAMPLE 6

The experiment of Example 1 was repeated in all essential details except that the oxazoline was prepared from 2550 g of tall oil fatty acids (largely $C_{18}$), 8.9 equivalents, 215 g propionic acid, 2.91 equivalents, 750 g of 2-amino-2-ethyl-1,3-propanediol, 6.3 moles, or 12.6 equivalents. The product was reacted with a mixture of styrene 200 g and methyl methacrylate 100 G, in the presence of ditert.-butyl peroxide 2 g, and azobis isobutyryl nitrile, 10 g, a chain initiator which promotes low molecular weight, then with formaldehyde, 675 g of a 40% solution in butanol to form the vinyl compound.

The low-molecular weight resin obtained by the above procedure was clear, had a low viscosity of B-¼, color of 15, acid value of 1.0, and was 100% non-volatile.

To 40 g of the resin was added 0.5 g of 6% cobalt salt drier and 1.0 g of 24% lead salt drier. The mixture was then blended with 4000 g of Portage silica sand, No. 430, at 70°F, after which 12 g of polyisocyanate (Mondur MR) was added. After blending 1 min., the mixture was poured into a mold. It was hard in 1 hour.

EXAMPLE 7

Following the general procedure of Example 1, an oxazoline oligomer blend was prepared by condensing 960 g of 2-amino-2-ethyl-1,3-propanediol (8.06 moles or 16.12 equivalents) with 644 g of dimethyl glutarate (8.05 equivalents). Tall oil fatty acids, 2200 g, (7.75 equivalents) were added and the solution was heated to 460°F. Water of reaction was separated by distillation. At an acid value of 14.5, the solution was cooled to 200°F at which time dibutyl acid phosphate, 5 g, and 130 g of water were added. The mixture was heated at 200°F for 90 minutes and was then cooled. The resulting resin had a viscosity of $Z_2$, color of 10, acid value 12.5. The infra-red absorption spectrum indicated the presence of considerable amide.

The resin prepared above was mixed for 2 minutes in varied proportions with 200 g of Portage silica Sand No. 430 at 70°F. Polyisocyanate (Mondur MR) and 5 drops of lead octoate drier were then added and mixed for 1 minute.

The sand mix was then dumped into a 5 inch diameter cylinder and tamped with a 10 lb. weight. The sand mixture was checked periodically for stiffness and surface hardness. Campbell hardness was checked after 30 minutes and 1 hour. The results obtained are:

|  | Run 1 | Run 2 | Run 3 | Run 4 |
|---|---|---|---|---|
| Resin, g | 0.8 | 1.0 | 1.2 | 1.5 |
| Mondur, MR, g | 1.2 | 1.0 | 0.8 | 0.5 |
| Stiff, Min. | 5 | 5 | 4 | 6 |
| Hard, Min. | 15 | 7 | 7 | 14 |
| Campbell hardness |  |  |  |  |
| 30 Min. | 3 | 7 | 8 | 0 |
| 1 Hour | 18 | 33 | 19 | 3 |

This experiment showed that moderate increase in resin content, compared with polyisocyanate, caused the core mixture to become hard very quickly, but a large difference between resin and polyisocyanate did not produce a very hard core.

EXAMPLE 8

Tall oil fatty acids 600 g (2.15 equivalents) and tris(-hydroxymethyl)aminomethane 240 g (1.98 moles, or 0.66 equivalents) were heated at 375°F for about 30 min. Adipic acid 475 g (3.25 moles, or 6.5 equivalents) was then added and heating was continued until it had all dissolved. 2-Amino-2-methyl-1-propanol 190 g (2.14 equivalents) was added and the mixture was slowly heated to 420°F until the acid value was below 10. Water of reaction was separated by distillation as it formed. The mixture was then allowed to cool. The product had a viscosity of $Z_6$, a color of 12+ and was 100% non-volatile.

I claim:

1. A process for preparing a non-polluting sand core for production of metal castings comprising the steps of mixing said sand with an oxazoline in a proportion of about 0.5–5.0% by weight of the sand and a mixture of 3–7% or up to 10% by weight of peroxide alone or in combination with metal driers based on the weight of said oxazoline, and placing the mixture thereby obtained in a mold to harden at ambient temperatures wherein said oxazoline is (a) a mono-oxazoline corresponding to the formula

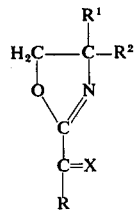

wherein $R^1$ and $R^2$ are methyl, ethyl, hydroxymethyl or acyloxymethyl corresponding to the formula

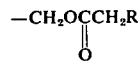

and are the same or different, R is an alkenyl group of from 1 to 18 carbon atoms, and X is $H_2$, or (b) a bis- or tris-oxazoline corresponding to the formula

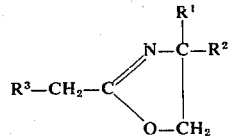

where $R^3$ is the group

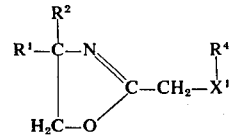

wherein $X^1$ is any divalent or trivalent unsaturated aliphatic hydrocarbon group of from 0 to 32 carbon atoms, and when $X^1$ is divalent, $R^4$ is hydrogen and when $X^1$ is trivalent, $R^4$ is the group

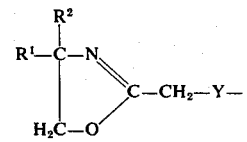

wherein Y is an unsaturated hydrocarbon of 16 carbon atoms or (c) mixtures thereof.

2. The process of claim 1 wherein $R^1$ and $R^2$ are methyl.
3. The process of claim 1 wherein $R^1$ and $R^2$ are hydroxymethyl.
4. The process of claim 1 wherein $R^1$ is ethyl and $R^2$ is hydroxymethyl.
5. The process of claim 1 wherein $R^1$ and $R^2$ are the acyloxymethyl group

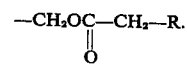

6. The process of claim 1 wherein said binder comprises a mixture of said mono-oxazoline and about 5 to about 95% of said bis-oxazoline or tris-oxazoline.
7. The process of claim 1 wherein said binder is said bis- or tris-oxazoline.
8. The process of claim 1 wherein R is an alkenyl group of from 1 to 18 carbon atoms.
9. The process of claim 1 wherein X' is divalent and $R^4$ is hydrogen.
10. The process of claim 1 wherein X' is trivalent and $R^4$ is the group

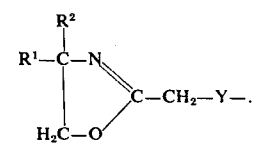

11. The process of claim 1 wherein said binder is a mixture of said mono-oxazoline, said bis-oxazoline and said tris-oxazoline.
12. The process of claim 1 wherein said binder is a mixture of said mono-oxazoline and said bis-oxazoline.
13. The process of claim 1 wherein said binder is a mixture of said mono-oxazoline and said tris-oxazoline.
14. The process of claim 1 wherein said binder is a mixture of said bis-oxazoline and said tris-oxazoline.

* * * * *

UNITED STATES PATENT OFFICE
CERTIFICATE OF CORRECTION

Patent No. 3,983,071   Dated September 28, 1976

Inventor(s) Louis A. Jurisch

It is certified that error appears in the above-identified patent and that said Letters Patent are hereby corrected as shown below:

Column 4, line 23, "were" should read -- where --.

Column 5, line 36, "praticular" should read -- particular --.

Column 6, line 31, "as" should read -- was --.

Signed and Sealed this twelfth Day of July 1977

[SEAL]

Attest:

RUTH C. MASON
Attesting Officer

C. MARSHALL DANN
Commissioner of Patents and Trademarks